US006033767A

United States Patent [19]

Krauter

[11] Patent Number: 6,033,767

[45] Date of Patent: Mar. 7, 2000

[54] THERMO-TRANSFER STRIP

[75] Inventor: Heinrich Krauter, Hombrechtikon, Switzerland

[73] Assignee: Pelikan Produktions AG, Egg, Switzerland

[21] Appl. No.: 08/894,512

[22] PCT Filed: Dec. 18, 1996

[86] PCT No.: PCT/EP96/05688

§ 371 Date: Nov. 5, 1997

§ 102(e) Date: Nov. 5, 1997

[87] PCT Pub. No.: WO97/23358

PCT Pub. Date: Jul. 3, 1997

[30] Foreign Application Priority Data

Dec. 22, 1995 [DE] Germany ............................ 195 48 401

[51] Int. Cl.[7] ........................................................ B32B 7/02

[52] U.S. Cl. .......................... 428/212; 428/195; 428/213; 428/216; 428/484; 428/488.1; 428/488.4; 428/913; 428/914

[58] Field of Search .................................... 428/195, 209, 428/212, 484, 488.4, 913, 914, 488.1, 200, 204, 206, 213

[56] References Cited

U.S. PATENT DOCUMENTS 5,484,644 1/1996 Imamura et al. ........................ 428/195
5,525,403 6/1996 Kawabata et al. ...................... 428/212

*Primary Examiner*—William Krynski
*Assistant Examiner*—Michael E. Grendzynski
*Attorney, Agent, or Firm*—Fay, Sharpe, Fagan, Minnich & McKee, LLP

[57] ABSTRACT

Thermo transfer ribbon with a customary carrier and arranged thereon is a first thermo-transferable layer, containing wax having a melting point of approximately 70 to 110° C. and approximately 1 to 22 percent by weight of a polymer wax plastifier having a glass temperature Tg of −30 to +70° C.; and a second thermo transferable layer, containing coloring substances, wax-compatible polymer binding agent and approximately 5 to 30 percent by weight of wax and/or wax-like substance, whereby the thermo-transferable layer (ii) has a melting enthalpy delta-H of approximately 10 to 80 J/g.

16 Claims, No Drawings

THERMO-TRANSFER STRIP

BACKGROUND OF THE INVENTION

The invention relates to a thermo-transfer ribbon with a customary carrier and thermo-transferable layers arranged thereon.

Thermo-transfer ribbons have been known for some time. They have a foil-like carrier, made, for example, of paper, of synthetic material or similar, a thermo-transfer color, specifically in the form of a synthetic material and/or wax-bonded dye or carbon black layer. In thermo-print technology, the thermo-transfer color is softened by means of a thermo-print head and transferred to a registration paper or a printing paper. Thermal printers or thermal print heads which can be used for this process are known, for example, from DE-AS 24 06 613 and from DE-OS 32 24 445. The following specific procedure can, for example, be followed. On the thermal print head of the printer a letter is formed which consists of heated points and is to be printed on a piece of paper. The thermal print head prints the thermo-transfer ribbon on an imprintable paper. The heated letter of the thermal print head, at a temperature of approximately 400° C. results in softening of the thermo-transfer color at the heated spot and transfer onto the piece of paper in contact therewith. The used part of the thermo-transfer ribbon is then passed to a spool.

The thermo-transfer ribbon can have several thermo-transfer colors next to each other. With the combination of the basic colors; blue, yellow, red, colored printed images can be produced. In contrast to the customary color photography, detrimental developing and fixation is eliminated. Thermo printers can be operated at high speed and without interfering ambient noise. For example, a DIN A4 size page can be printed in about 10 seconds.

Serial printers or line printers can be used for printing. The serial printers operate with a relatively small, movable print head of up to approximately 1 $cm^2$. On the print head are arranged, vertically vis-a-vis the writing direction, 1 or 2 rows of dots (dot=addressable heating point). The dot-diameter is between approximately 0.05 and 0.25 mm. The number of dots per dot row is between 6 and 64, which corresponds to a resolution ranging from 2 to 16 dots/mm. Higher resolutions, for example, 24 to 32 dots/mm can be expected in the near future. It is typical with respect to the serial thermo head that it is moved during the printing process horizontally toward the transport direction of the paper. In contrast to the serial print head, a line print head is a stationary head or strip. Since the print strip is not movable, it must span the width of the substrate which is to be printed. Print strips are offered at lengths of up to 297 mm. Resolution and dot-size correspond to those of serial heads. The serial printers are used in typewriters, video print outs, in PC applications and for word processors, while line printers are used specifically in bar code graph printers, computer units with high output volume data, in fax machine applications, ticket printers, address printers, color copiers and the CAD/CAM system.

In addition to the above described thermo-transfer ribbons, there are also thermo-transfer ribbons where the thermal symbol is not imprinted through action of a thermal printer, but by means of resistance heating of the specifically designed foil-like carrier. The resistance heating occurs in that the thermo-transfer color, and/or its carrier contain electrically conductive materials. The thermo-transfer color, which is the "functional layer" during the printing process, contains, in addition, the materials already described above. This is also called an ETR material (electro thermal ribbon material). A corresponding thermo-transfer print systems is described, for example, in U.S. Pat. No. 4,309,117.

In the above described systems of thermo-transfer ribbons, the sharpness of the print and the optical density of the produced print depends, among others, upon the adhesion to the paper of the thermo-transfer color. It is proportional to the adhesive surface of the adhesive power. Rough paper has low adhesive surface, since only the raised portions of the paper surface are wetted by the melted thermo-transfer color. For that reason, in DE-A-35 07 097 there is formed on the layer of the thermo-transfer color a so-called "filling layer", which consists of a in melted state low viscosity material, which flows, during the printing process, into the valleys of the rough paper surface and thus increases the adhesive surface. It is of disadvantage here that the molten filling layer, in case of very smooth paper, having a roughness of no more than 200 Bekk, is no longer able to penetrate the paper during the printing process, so that a layer remains between paper surface and color layer. The layer, therefore, has the effect of a hold-off layer, as described in EP-A-O 042 954. The hold-off layer, however, results in insufficient document color fastness, since it prevents the penetration of the thermo-transfer color into the paper. For a document color fastness layer, a hold-off layer is undesirable.

In order to avoid the above indicated drawbacks of the state of the art, specifically to beneficially facilitate the writing on rough as well as smooth paper, EP-B-0-348 661 suggests to incorporate into the hold-off layer or adhesive layer, also called top coat, a tackifying, in finely dispersed form in paraffin embedded hydrocarbon, whereby the paraffin has a melting point of 60 to 95° C. The teaching according to EP 0 206 036 attempts to avoid the necessity of such adhesive layer or top coat, in that a wax layer is formed on the layer of the synthetic material-bonded thermo-transfer color and the synthetic material-bonded thermo-transfer color contains a thermoplastic synthetic material with a softening point of 60 to 140° C.

The above described thermo-transfer ribbons gain more and more access in high-speed printers, specifically in industrial application, whereby in this case a so-called "real edge" or "corner-type" print head is going to be used. With these print heads, the row of dots is arranged on a ceramic substrate, close to the edge or directly on the edge. The advantage of the edge-type head lies in shorter cooling down times and, consequently, higher writing frequency. Print speeds of from 3 to 12" per second can be obtained with this type of head. Special requirements exist as to print quality with respect to prints obtained with high speed print, particularly high speed color print, i.e. requirements regarding edge sharpness, resolution and optical density. One particular field of application is the printing of paper and plastic labels. As to the latter, high scratch-resistance of prints is desired.

The thermo-color ribbons provided up to now as state of the art for high speed printer application do not fully meet the mentioned requirements.

The invention was therefore based on the object of making available a thermo-transfer ribbon with which high printing speeds and satisfactory print quality can be obtained. The thermo-transfer color transferred during printing is to demonstrate excellent adhesion and excellent scratch-resistance, specifically on paper and plastic labels.

SUMMARY OF THE INVENTION

This object is solved, according to the invention, by means of a thermo-transfer ribbon which has, on a customary carrier, in the stated sequence:

(i) a first thermo-transferable layer, containing waxes with a melting point of approximately 70 to 110° and approximately 1 to 22% by weight of a polymer wax plastifier, having a glass temperature Tg of −30 to +70° C., and (ii) a second thermo-transferable layer, containing a dye, wax-compatible polymer bonding agent and approximately 5 to 30% by weight of wax and/or wax-like substances, whereby the thermo-transferable layer (ii) has a melting enthalpy delta-H of approximately 10 to 80 J/g.

In a preferred specific embodiment, the layer (ii) additionally contains about 5 to 40, specifically about 10 to 20% by weight of filler substances.

DETAILED DESCRIPTION OF THE INVENTION

In high speed print, the thermo print head remains only a very brief time at any given spot of the thermo-transfer ribbon. Since, on the other hand, the print head performance is limited, there is only very little energy available for the softening of the thermo-transferable layer. It has now been determined that in order to obtain high print speeds, a thermo-transferable layer can beneficially be used with a low melting enthalpy. However, it has been shown that layer compositions with low melting enthalpy have, in melted state, high adhesion vis-a-vis the carrier material, so that, as a result, there would be, during the printing process, insufficient transfer to the accepting substrate. The invention solves this problem by means of a specifically designed layer (i) between the carrier and the layer (ii) with low melting enthalpy.

The waxes employed in layer (i) comply with the usual definition of wax, except for subject restriction of melting point ranging from approximately 70 to 110° C. This involves, in the most comprehensive sense, material which is solid to brittle, coarse to finely crystalline, transparent to opaque, but not glass-like, which melts above approximately 70° C., but which, just a little above the melting point, has a relatively low viscosity and is not stringy. Waxes of this type can be divided into hydrocarbon waxes (alkanes without functional groups) and into waxes of long chained organic compounds with functional groups (primarily esters and acid waxes). Among the hydrocarbon waxes are included, aside from the mineral wax, the solid hydrocarbons obtained from crude oil and also synthetic paraffins. Among the waxes with functional groups are all vegetable waxes and chemically altered waxes. Ester waxes consist, in essence, of esters which are formed from linear carbon acids with approximately 18 to 34 C-atoms and approximately equally long linear alcohols. In acid waxes there are high percentages of free carbon acids. Waxes with functional groups are preferred. Ester waxes should be specifically named here, for example on basis of montan wax, partially saponified ester waxes, acid waxes and oxidized and esterified synthetic waxes. Among the particularly preferred ester waxes are vegetable waxes, such as carnauba wax and candelilla wax as well as high-melting, closely cut paraffins. Particularly preferred, within the scope of the invention, are waxes with a melting point from 70 to 105° C. Specifically mentioned here as being preferred are: Carnauba wax, LG wax BASF and Hoechst wax E.

Layer (i) contains, in addition, approximately 1 to 22% by weight, preferably approximately 2 to 20% by weight and most specifically approximately 4 to 10% by weight of polymer wax plastifiers. This has the effect that when hard waxes are employed, specifically in the form of ester waxes and high melting, closely cut paraffins, they become plastified and thereby lose their brittleness and tendency to splinter. They ensure excellent anchoring or adhesion of separation layer to the carrier material. Ester waxes are very hard or brittle waxes, i.e. they can be pulverized in cold state. If these are mixed with the named polymer wax plastifiers, elastic products are created which can barely be pulverized. The named quantity of polymer wax plastifiers is critical. Larger quantities than stated should be avoided because otherwise the release effect toward the carrier is insufficient. Too small a quantity of polymer wax plastifier has, under certain circumstances, the result that brittle wax is inadequately plastified and layer (i) will not demonstrate uniform "peel-off" behavior or will result in a non-homogenous image, primarily in continuous color surfaces.

Considered as polymer wax plastifiers are polyesters, co-polyesters, polyvinyl-acetates, polystyrols with a glass temperature Tg from −30 to +70° C. Preferred among these are polyesters and co-polyesters. These involve preferably linear saturated polyesters or co-polyesters with an average molecular weight of 1500 to 18000.

Layer (i) usually has a melting enthalpy Delta-H of approximately 150 to 210 J/g. Layer (ii) has a melting enthalpy Delta-H of approximately 10 to 80, specifically approximately 15 to 50 J/g. Thermo-transfer color layers according to the state of the art have usually a melting enthalpy Delta-H of higher than 130 to 220 J/g. Under "melting enthalpy Delta H" is understood the endothermal form amount which represented by the peak surface, which, when taking the DSC measurement, at temperature interval 25 to 120° C. is encompassed by the heat/flow temperature curve and the base line. In the named temperature interval, the layer composition (ii) need not necessarily melt completely, which is regularly the case if the layer contains dispersed insoluble components, such as fillers. It is of importance that the layer (ii) undergoes, in the stated temperature interval, at least one phase transfer, wherein it passes from solid state to a relatively low viscous state, and that the phase transfer creates a peak in the DSC calorigram which corresponds to the specified energy amount. With occurrence of several peaks, adjustment must be made to the sum of the peak surfaces.

In order to obtain a sufficiently low melting enthalpy, special importance must be paid to the selection of the binding agent. The binding agent of layer (ii) must, furthermore, be compatible with wax, so that layer (ii) will have adequate adhesion relative to layer (i). Under "wax-compatible" is hereby understood that this polymer is compatible with a liquid wax and that during cooling of a solution or of a dispersion of the polymer there will be no phase separation in the wax. Wax-compatible polymers in the sense of the invention distinguish themselves in that they are meltable below approximately 100° C. and are sticky in melted state. Suitable polymers are, for example, Ethylene-Vinylacetate-Copolymers (EVA), Ethylene-Acrylic Acid-Copolymers, Polyamides and Ionomer-resins. Preferred among these are ethylene-acrylic acid copolymers and EVA, specifically a product with a vinylacetate contents of ≧approx. 25% by weight; and types with a least approximately 33 to 40% by weight vinylacetate are particularly suitable.

Layer (ii) contains in addition approximately 5 to 30% by weight, preferably approximately 15 to 25% by weight, of waxes and/or wax-similar substances. The addition of waxes and/or wax-similar substances prevents sticking of the ribbon in rolled-up state, or adhesion of the ribbon against the receiving substrate at locations where no symbol is to be transferred. A higher than indicated addition of wax should be avoided, because the high melting enthalpy of the wax would cause the melting enthalpy of the entire formulation of layer (ii) to become too high. While a lower addition of wax results in lower melting enthalpy, it will, however not prevent stickiness to the desired extent. Suitable as waxes for layer (ii) are: closely cut paraffin waxes, ester waxes, acid waxes, micro-waxes and modified micro-waxes. Natural waxes are not preferred. Closely cut paraffin waxes are particularly preferred. The enumerated waxes distinguish themselves in that the softening point and the melting point are close to each other. During the heating process, a minimum of 80% of the material should become liquefied within a temperature interval of 10° C. The melting point of the waxes in layer (ii) lies preferably at about 70 to 105° C.

Also added to the layer (ii) are preferably fillers (extenders) such as for example aluminum silicate, aluminum oxide, silica, talcum, calcium carbonate, aluminum hydroxide, zinc oxide, silicic acid, China clay, titanium dioxide etc. The extenders provide for lightening of colors (transparent layers) and, simultaneously, there is a beneficial effect upon the "adhesive behavior" of the ribbon.

A multitude of other additions can be incorporated in layer (ii). The layer of the thermo-transfer color preferably contains one or several resins with a melting point between 80 to 150° C. Appropriate resins are, for example, KW-resins, terpenephenol resins, modified colophonium resins, cumarone-indene resins, malaic resins, alkyde resins, phenol resins, polyester resins, polyamide resins and/or phthalate resins. Particularly preferred among these are KW-resins and polyterpene resins. The ratio of wax-compatible polymer to resin in the thermo-transfer color preferably ranges between 70:30 and 90:10 (weight/weight).

Coloration of layer (ii) can be done by any chosen coloring agent. This may involve pigments, such as carbon black, but also solvent-soluble-and/or medium-soluble dyes, such as the commercial product Basoprint, organic color pigments, and also various azo dyes (Cerces dyes and oil-soluble dyes). Carbon black is considered particularly suitable within the scope of the present invention. Layer (ii) preferably contains the coloring agent, specifically the color pigment in an amount ranging from approximately 10 to 20% by weight.

The viscosity of layer (ii) must be sufficiently low so that the color can be released quickly and dot-correctly. The thermo-transfer color of the thermo-transfer ribbon according to the invention preferably has a viscosity from approximately 500 to 3000 mPa.s, measured at 140° C. in a Brookfield-Rotation-Viscometer. Specifically targeted is a range from 600 to 1500 mPa.s. The polymer binding agent employed in layer (ii) is amorphous or, perhaps, part-crystalline and requires little energy for the melting process. After the printing process, separation takes place of the thermo-transfer ribbon from the acceptor as long as layer (ii) is still "liquid", i.e. is present in melted or softened state. This circumstance permits use of polymer resin-bonded colors, which, in turn, ensures high edge sharpness, excellent resolution and optical density. This is primarily of importance with real-edge-type print heads. The synthetic material-bonded color layer ensures high scratch-resistance of the transferred printing symbols, both on paper as well as on plastic labels.

The thicknesses of layers (ii) and (i) are not critical. Layer (i) preferably has a thickness of approximately 0.5 to 4 $\mu$m, specifically approximately 1 to 2 $\mu$m. Layer (ii) preferably has a thickness of approximately 1 to 5 $\mu$m, specifically approximately 1 to 3 $\mu$m.

The type of carrier of the thermo-transfer ribbon according to the invention likewise is not critical. This involves preferably polyethyleneterephthalate foil (PETP) or condenser papers. Selection parameters are highest possible elasticity values and thermal stability, with small foil thicknesses. The PETP foils are available down to approximately 2.5 $\mu$m in thickness, condenser paper down to approximately 6 $\mu$m.

A beneficial refinement of the idea according to the invention, specifically with respect to obtaining a beneficial print, is based on inclusion of the teaching of EP-B-0 133 638. In accordance therewith, a layer of wax or wax-like material is formed on the reverse side of the carrier, specifically in a thickness not exceeding 1 $\mu$m and most specifically preferred in form of a molecularly formed (thickness) of up to 0.01 $\mu$m. The coating material in this instance consists preferably of paraffin, silicone, natural waxes, specifically carnauba wax, bees wax, ozokerite and paraffin or synthetic waxes, specifically acid waxes, ester waxes, partially saponified ester waxes and polyethylene waxes, glycols or polyglycols and/or tensides.

In some cases it may be of benefit to incorporate additives, which improve the properties of the ribbon. In these instances, the skilled person will select, within the scope of technical considerations, that product with which he would like to achieve the desired effect.

The teaching according to the invention can be utilized with particular benefit in color print. The preparation of color prints through mixing of colors with the aid of thermo-transfer printing takes place, normally, according to the principle of subtractive color mixing. The subtractive colors mixture is achieved by means of superposition of coloring agents onto a white substrate, that is to say by means of the secondary colors yellow, magenta and cyanogen. That means with respect to the thermo-transfer print, that a least these three color must be present, on one or several ribbons, intransferable form, i.e. embedded in a thermo-transfer color. Additionally, a fourth "color", i.e. black, may be provided, for example on the basis of carbon black, inasmuch as a mixed shade of black frequently will not meet the requirements. These three or four transferable colors can be supplied to the printer in different ways. In one mode, the colors may be located on three or four separate ribbons, which are passed in succession past the thermo print head. Another mode is the arrangement of the colors on one ribbon, whereby they can be arranged either in strips next to each other ("line striped"), in segments behind one another ("cross striped") or in mosaic fashion. Aside from the subtractive color mixing (superposed color printing) the autotype color mixing is also possible with good resolution thermoprint heads. With this type of color mixing, not only are the secondary colors printed on top of each other but also next to each other. As a result, one obtains a significantly greater spectrum of color possibilities, which goes beyond the possibilities of the purely subtractive color mixing. Attention should be paid in the formulation of thermo print colors that yellow is only printed onto the print receptor substrate, while magenta and cyanon are placed also on already printed locations. The adhesive properties of the print colors must be adjusted accordingly.

In addition to the above mentioned multi-color print, the present invention can, of course, also be employed with good success in monochrome color printing. The thermo-transfer ribbon according to the invention can be manufactured by multiple method, using customary application processes. This can be done, for example, by means of spraying or printing of a solution under dispersion, either with water or with an organic solvent as a dispersion medium or carrier medium, by application from the melted material, which applies in particular with respect to the wax-bonded layer (i), or also by means of application with a coating blade in form of a hydrous suspension with finely dispersed material therein which is to be applied.

For application of the release-layer as well as the color-layer, coating processes such as reverse-roll and/or gravure coating have proven themselves particularly beneficial.

For the practical realization of the present invention, the following basic conditions can be named with respect to the application amounts of the individual layers. Onto a carrier film, specifically a polyester film with a thickness of approximately 2 to 8 μm, specifically a thickness of approximately 4 to 5 μm, successive application is made of: coating substance for the formation of layer (i) 0.5 to 4 g/m$^2$, preferably approximately 0.5 to 2 g/m$^2$, and coating substance for the formation of layer (ii) 1 to 5 g/m$^2$, preferably approximately 1 to 2 g/m$^2$. Where needed, a reverse side coating as mentioned above, is formed on the reverse side of the carrier, having a thickness of approximately 0.01 to 0.2 g/m$^2$, specifically approximately 0.05 to 0.1 g/m$^2$.

The invention is explained in more detail below, based on examples.

EXAMPLE 1

Onto a customary carrier of polyester, having a layer thickness of approximately 6 μm a material according to the following formula is applied for the formation of

| Layer (i): | |
|---|---|
| carnauba wax (melting point 38–85° C.) | 95 parts by weight |
| polyester resin (Tg −4° C.) | 5 parts by weight |
| | 100 parts by weight |

The above material is applied with a ductor blade in a solvent dispersion (approx. 8 to 12%, toluol/isopropanol 80.20) with a dry thickness of approximately 1.5 μm. The evaporation of the solvent is accomplished by passage of hot air at a temperature of approximately 100° C. Subsequently, layer (ii) is applied by means of reverse roll process, in form of a solvent-dispersion having the following formula (approx. 15%, toluol/isopropanol 80:20):

| Layer(ii) | |
|---|---|
| EVA | 55 parts by weight |
| Paraffin | 15 parts by weight |
| carbon black | 30 parts by weight |
| | 100 parts by weight |

Layer (ii) had an endothermal melting enthalpy delta-H of 38 J/g (as determined by DSC on a Mettler TA 3000 instrument (stoking rate 1 34° C./min)).

EXAMPLE 2

Example 1 was repeated except for the following modification: the following formula were used for layer (i) and (ii) respectively:

| | |
|---|---|
| Layer (i): | |
| Ester wax (melting pt: 80–85° C.) | 55 parts by weight |
| Paraffin HNP | 37 parts by weight |
| Polyester resin (Dynapol ®, | 8 parts by weight |
| Hüls AG, D Tg: −28° C.) | |
| | 100 parts by weight |
| Layer (ii) | |
| EVA | 55 parts by weight |
| modified microwax | 15 parts by weight |
| (Petrolite WB 17) | |
| Transpafill (Degussa-D) | 15 parts by weight |
| carbon black | 15 parts by weight |
| | 100 parts by weight |

Layer (ii) had an endothermal melting enthalpy delta-H of 17 J/g (stoking rate 2.68° C./min).

I claim:

1. Thermo-transfer ribbon with a carrier and arranged thereon in the specified order:

(i) a first thermo-transferable layer, containing wax having a melting point of approximately 70 to 110° C. and approximately 1 to 22 percent by weight of a polymer wax plastifier selected from the group consisting of polyesters, copolyesters, polyvinyl acetates, polystyrols, and mixtures thereof having a glass transition temperature Tg from about −30 to +70° C. and (ii) a second thermo-transferable layer, containing coloring substances, wax-compatible polymer binding agent and approximately 5 to 30 percent by weight of wax and/or wax-like substance, whereby the thermo-transferable layer (ii) has a melting enthalpy delta-H of approximately 10 to 80 J/g.

2. Thermo-transfer ribbon according to claim 1, characterized in that the layer (ii) has a melting enthalpy delta-H of approximately 15 to 50 J/g.

3. Thermo-transfer ribbon according to claim 1 characterized in that the layer (ii) additionally contains approximately 5 to 40 percent by weight of extenders.

4. Thermo-transfer ribbon according to claim 1 characterized in that the polymer wax plastifier in layer (i) has a glass temperature Tg of approximately −20 to +10° C.

5. Thermo-transfer ribbon according to claim 1 characterized in that the wax of layer (i) is an ester wax.

6. Thermo-transfer ribbon according to claim 1 characterized in that layer (i) contains 4 to 10 percent by weight of polymer wax plastifier.

7. Thermo-transfer ribbon according to claim 1 characterized in that the wax-compatible polymer binding agent of layer (ii) is an ethylene-vinylacete copolymer, ethylene-acrylic acid-copolymer, polyamide and/or ionomer resin.

8. Thermo-transfer ribbon according to claim 1 characterized in that the wax-compatible polymer binding agent of layer (ii) is amorphous or substantially free from crystallization.

9. Thermo-transfer ribbon according to claim 1 characterized in that the layer (ii) also contains hydrocarbon resins or polyterpene resins.

10. Thermo-transfer ribbon according to claim 1 characterized in that layer (ii) has a viscosity of approximately 500 to 3000 mPa.s, measured at 140° C. with a Brookfield-Rotation Viscometer.

11. Thermo-transfer ribbon according to claim 1 characterized in that the thickness of layer (i) measures 0.5 to 4 μm.

12. Thermo-transfer ribbon according to claim 1 characterized in that the thickness of layer (ii) measures approximately 1 to 5 μm.

13. Thermo-transfer ribbon according to claim 1 characterized in that the carrier is a polyethylene-terephthalate foil.

14. Thermo-transfer ribbon according to claim 1 characterized in that on the reverse side of the carrier, a layer of wax or wax-like material is formed with a thickness of not more than approximately 1 μm.

15. A high-speed printer with a print head of the "real edge" or "corner type" kind and including a thermo-transfer ribbon with a carrier and arranged thereon in the specified order:

(i) a first thermo-transferable layer, containing wax having a melting point of approximately 70 to 110° C. and approximately 1 to 22 percent by weight of a polymer wax plastifier selected from the group consisting of polyesters, copolyesters, polyvinyl acetates, polystyrols, and mixtures thereof having a glass transition temperature Tg from about −30 to +70° C. and (ii) a second thermo-transferable layer, containing coloring substances, wax-compatible polymer binding agent and approximately 5 to 30 percent by weight of wax and/or wax-like substance, whereby the thermo-transferable layer (ii) has a melting enthalpy delta-H of approximately 10 to 80 J/g.

16. A method of subtractive color printing whereby three secondary colors, yellow, magenta and cyan, are sequentially located on a color ribbon or located on a color ribbon next to each other, or on three different color ribbons, running parallel during printing, the color ribbon or ribbons comprising a thermo-transfer ribbon with a carrier and arranged thereon in the specified order:

(i) a first thermo-transferable layer, containing wax having a melting point of approximately 70 to 110° C. and approximately 1 to 22 percent by weight of a polymer wax plastifier selected from the group consisting of polyesters, copolyesters, polyvinyl acetates, polystyrols, and mixtures thereof having a glass transition temperature Tg from about −30 to +70° C. and (ii) a second thermo-transferable layer, containing coloring substances, wax-compatible polymer binding agent and approximately 5 to 30 percent by weight of wax and/or wax-like substance, whereby the thermo-transferable layer (ii) has a melting enthalpy delta-H of approximately 10 to 80 J/g.

* * * * *